(12) United States Patent
Balakrishnan et al.

(10) Patent No.: US 9,405,771 B2
(45) Date of Patent: Aug. 2, 2016

(54) ASSOCIATING METADATA WITH IMAGES IN A PERSONAL IMAGE COLLECTION

(71) Applicant: Microsoft Corporation, Redmond, WA (US)

(72) Inventors: Shobana Balakrishnan, Redmond, WA (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 13/802,787

(22) Filed: Mar. 14, 2013

(65) Prior Publication Data

US 2014/0270407 A1    Sep. 18, 2014

(51) Int. Cl.
*G06F 17/30*    (2006.01)
*G06K 9/00*    (2006.01)
*G06Q 50/00*    (2012.01)

(52) U.S. Cl.
CPC ...... *G06F 17/30256* (2013.01); *G06K 9/00275* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,325,999 B2 | 12/2012 | Kapoor et al. | |
| 8,341,145 B2 | 12/2012 | Dodson et al. | |
| 8,798,401 B1 * | 8/2014 | Johnson et al. | 382/305 |
| 8,861,804 B1 * | 10/2014 | Johnson et al. | 382/118 |
| 2006/0251338 A1 * | 11/2006 | Gokturk et al. | 382/305 |
| 2011/0182482 A1 | 7/2011 | Winters et al. | |
| 2012/0076367 A1 | 3/2012 | Tseng | |
| 2012/0114199 A1 | 5/2012 | Panyam et al. | |

OTHER PUBLICATIONS

Choi et al. "Face Annotation for Personal Photos Using Collaborative Face Recognition in Online Social Networks." 16th International Conference on Digital Signal Processing, Jul. 5, 2009, pp. 1-8.*
Hughes. "A Social Framework for the Organisation and Automated Annotation of Personal Photo Collections." 3rd International Workshop on Semantic Media Adaptation and Personalization, Dec. 15, 2008, pp. 112-115.*
Knies, Rob., "Computers Working on Your Behalf", Retrieved at <<http://research.microsoft.com/en-us/news/features/030310-behalf.aspx>>, Mar. 7, 2010, pp. 1-4.
Lee, et al., "Face Discovery with Social Context", Retrieved at <<http://vision.cs.utexas.edu/projects/facediscovery/bmvc2011_facediscovery.pdf>>, In Proceedings of the British Machine Vision Conference, Aug. 2011, pp. 1-11.

(Continued)

*Primary Examiner* — Jon Chang
(74) *Attorney, Agent, or Firm* — Nicholas Chen; Kate Drakos; Micky Minhas

(57) ABSTRACT

Various technologies pertaining to assigning metadata to images in a personal image collection of a user based upon images and associated metadata assigned thereto that are accessible to the user by way of a social network application are described. An account of the user in a social network application is accessed to retrieve images and metadata that is accessible to the user. A face recognition algorithm is trained based upon the retrieved images and metadata, and the trained face recognition algorithm is executed over the personal image collection of the user, where the personal image collection of the user is external to the social network application.

20 Claims, 11 Drawing Sheets

(56) References Cited

OTHER PUBLICATIONS

Stone, et al., "Autotagging Facebook: Social Network Context Improves Photo Annotation", Retrieved at <<http://dash.harvard.edu/bitstream/handle/1/2920117/Stone_AutotaggingFacebook.pdf?sequence=4>>, In Paper of Computer Vision and Pattern Recognition Workshops, Computer Society Conference on IEEE, Jun. 23, 2008, pp. 1-8.

Mitchell, Justin., "Making Photo Tagging Easier", Retrieved at <<http://blog.facebook.com/blog.php? post=467145887130>>, Dec. 15, 2010, pp. 1-3.

"International Search Report & Written Opinion for PCT Patent Application No. PCT/US2014/021457", Mailed Date: Jun. 25, 2014, Filed Date: Mar. 7, 2014, 13 Pages.

"Fotobounce (TM) Releases Version 3.7.4 with "Private Cloud" Photo Access—in Fotobounce.com", Published on: Oct. 12, 2011, Retrieved at: http://fotobounce.com/wp-content/uploads/2012/10/Fotobounce-V3.7.4-Release.pdf, p. 1.

Acquisti, Alessandro, "Faces of Facebook: Privacy in the Age of Augmented Reality", Published on: Jan. 19, 2012, Retrieved at: http://www.blackhat.com/html/webcast/webcast-2012-facesof-facebook.html, 58 pages.

Schifreen, Robert, "Automatic Face Recognition Helps Tag Your Photo Collection", Published on: Jun. 14, 2012, Retrieved at: http://www.techsupportalert.com/content/automatic-face-recognition-helps-tag-your-photo-collection.htnn, 6 pages.

"International Preliminary Report on Patentability Issued in PCT Patent Application No. PCT/US2014/021457", Mailed Date: Jul. 13, 2015, 9 Pages.

* cited by examiner

ASSOCIATING METADATA WITH IMAGES IN A PERSONAL IMAGE COLLECTION

BACKGROUND

Digital cameras have become relatively ubiquitous. For example, many mobile telephones are equipped with digital cameras that allow users thereof to capture relatively high resolution images. Additionally, many mobile telephones are equipped with a relatively large amount of computer-readable data storage, such that hundreds or even thousands of digital images can be retained on the mobile telephone. A user of a mobile telephone can transfer selected images thereon to a social network application, to another computing device of the user, etc. Typically, people carry their mobile telephones with them, thereby causing a greater number of images to be captured by people when compared to the number of images captured by people a relatively short time ago. Moreover, using digital cameras, there is no cost to a user when capturing images. A combination of the above has caused personal image collections of users to become quite large. Other issues include the fact that oftentimes images of users are spread across numerous systems, such as personal computers at one's home, external storage drives (e.g., USB drives), cloud storage services, and on social network sites. Despite the increasing ubiquity of digital cameras and phones that are configured to relatively easily upload images to social networks, users often retain a large volume of images in a personal collection in order to keep their collection private.

Oftentimes, a device employed to capture an image will automatically assign metadata to such image. For example, a mobile telephone equipped with a Global Positioning System (GPS) receiver can assign metadata to an image that indicates a time that the image was captured and a location where the image was captured. Images may then be indexed in the personal image collection of the user based upon metadata assigned thereto. It has been found, however, that timestamps assigned to images from devices utilized to capture such images can be unreliable (e.g. a clock may not be set correctly), and is often not helpful to the user with respect to organizing images. For instance, a user may have difficulty in remembering what year a particular event captured in an image took place, much less which month, week, or specific day. Still further, if the personal image collection includes scanned images (or transferred images), the timestamp assigned thereto may be the date that scanning was performed (or transferred), and not a date relevant to an event captured in an image.

Computer-executable applications have been developed that assist users in connection with applying other metadata to images in personal image collections. These applications, however, typically require a significant amount of manual input from users thereof. That is, a user must manually visually categorize faces, and subsequently manually apply metadata thereto (e.g., the user may indicate that an image includes a particular person or is relevant to a certain event). Images in the personal image collection of the user may then be indexed as a function of metadata assigned by way of the application. Again, the relevance of the index depends on the quality of the metadata, which can require a relatively large amount of manual input from the user.

SUMMARY

The following is a brief summary of subject matter that is described in greater detail herein. This summary is not intended to be limiting as to the scope of the claims.

Described herein are various technologies pertaining to the leveraging of metadata assigned to images in a social network application in connection with associating metadata with images in a personal image collection of a user. In other words, described herein are various technologies for employing relatively "clean" metadata associated with images in social networking applications to remedy a deficit in metadata associated with images in a personal image collection (retained external to the social networking application). Relatively recently, social network applications have been configured to receive images for the purposes of sharing such images with contacts of users. Therefore, for instance, a user may wish to share an image about a certain event with her contacts, and thus may upload the image about the event to the social network application. To inform the contacts of the user that are captured in the image that the image is available for viewing, the user can assign metadata to the image through use of tools provided by the social network application. Pursuant to a particular example, the user may tag an image as including a particular contact, and may further indicate a particular portion of the image that includes the contact (by assigning a bounding box around a face of the contact). This process can be repeated for multiple images and across multiple users. Generally, however, a number of images uploaded to the social network application by the user will be less than a number of images in the personal image collection of the user.

It has been observed that, due to the social nature of applying metadata to images by way of social network applications, users willingly apply metadata to a large number of images uploaded to the social network application. As will be described in greater detail herein, this metadata assigned to images can be leveraged to infer metadata that is desirably applied to images in the personal image collection of the user. Subsequently, images in the personal image collection can be indexed by the inferred metadata. Using this approach, the user can search an image collection with the query "John Smith" and be provided with images from the personal image collection that are relevant to John Smith (that have been tagged as including John Smith or otherwise being relevant to John Smith) without requiring the user to manually assign tags to images in the personal image collection of the user.

Pursuant to an example, a computer-executable application installed on a client computing device can receive an indication from a user that the user wishes to cause metadata to be assigned to images in the personal image collection of the user based upon metadata assigned to images that are accessible to the user by way of a social network application, with which the user has an account. Responsive to receiving such indication, authentication data can be transmitted to the social network application (e.g., username and password of the user), such that access to the account of the user on the social network application is obtained. Images accessible to the user by way of the social network application (and metadata assigned thereto) are then retrieved. Images that are accessible to the user by way of the social network application can include images posted by the user to the social network application as well as images posted by contacts of the user (as registered with the social network application). The retrieved images and metadata assigned thereto can thereafter be employed to automatically assign metadata to images in the personal image collection of the user, wherein an assumption is that people captured in images in the personal image collection are also a part of a social network of the user, and therefore tagged images of such people exist in the social network application.

In an exemplary embodiment, images in the personal image collection of the user can be automatically assigned with metadata (tags) that identifies people captured in such images, such that the images can be indexed by people included in the images. For example, the images retrieved from the social network application (and metadata associated therewith) can be employed to train a face recognition algorithm. That is, at least one image in the images accessible by way of the social network application can be tagged as having at least one person therein. The face recognition algorithm can be trained such that a model of the face of the at least one person tagged in the image is learned. Such model may then be applied by the face recognition algorithm to identify images in the personal image collection of the user that include the face of the at least one person. Accordingly, images in the personal image collection of the user that include the at least one person can be assigned with metadata that indicates that the at least one person is included in such images.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
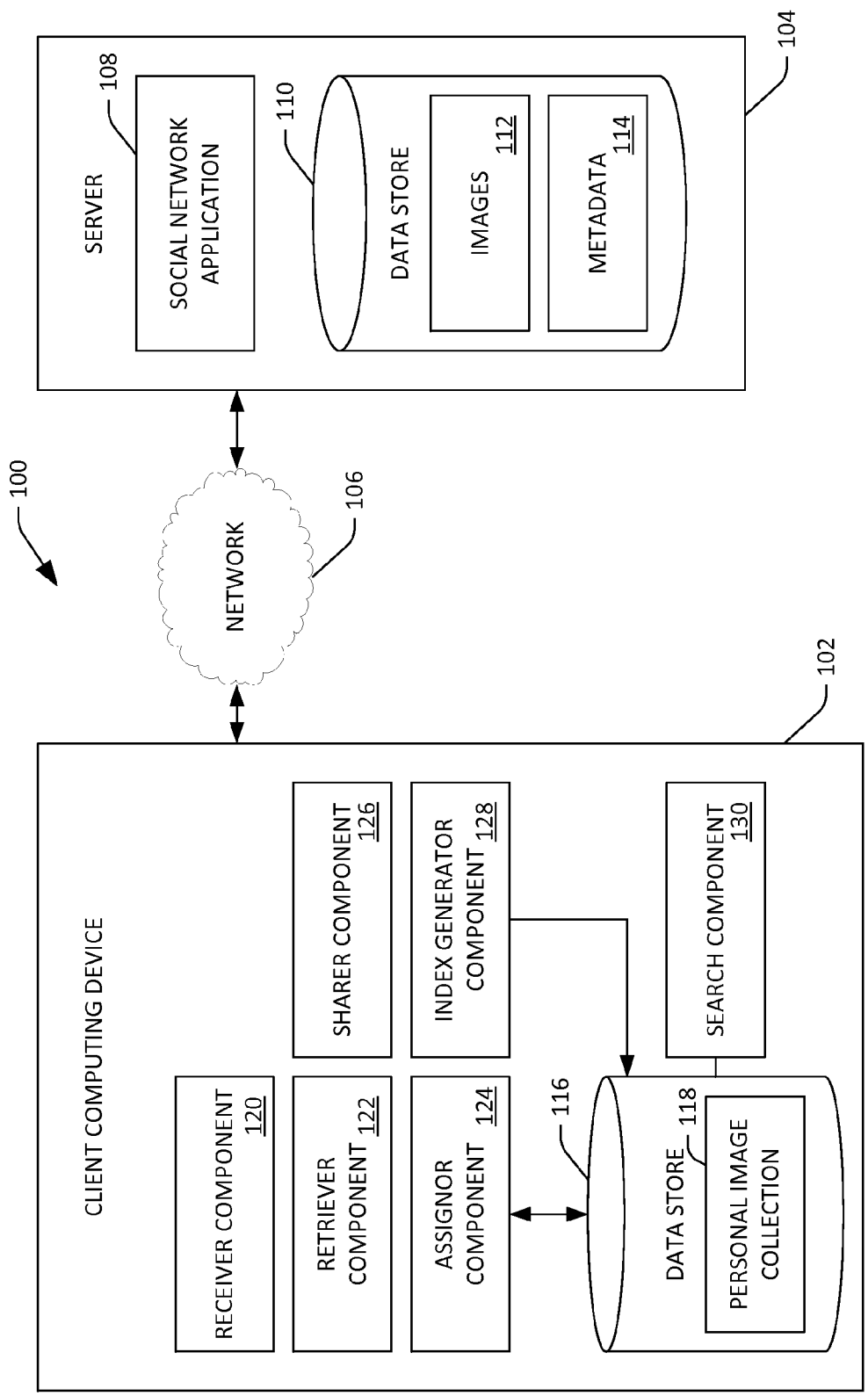
FIG. 1 is a functional block diagram of an exemplary system that facilitates bootstrapping metadata applied to images accessible to a user by way of a social network application to automatically assign metadata to images in a personal image collection of the user.

Various technologies pertaining to applying metadata to images in a personal image collection of a user are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 is illustrated that facilitates application of metadata to images in a personal image collection of a user based upon images and corresponding metadata accessible to the user by way of a social network application. The system 100 includes a client computing device 102, which may be a desktop computing device, a network-attached storage (NAS), a mobile computing device, such as a mobile telephone, a mobile camera, a portable media player, a tablet (slate) computing device, a laptop computing device, or the like.

The system 100 additionally comprises a server 104 that is accessible to the client computing device 102 by way of a network 106. The server 104 is configured with computer-executable code, which is stored in a memory as a social network application 108. While the client computing device 102 is shown as being in communication with the server 104 by way of the network 106, it is to be understood that the social network application 108 may be executed over a plurality of servers that can be accessed by the client computing device 102 by way of the network 106. That is, execution of the social network application 108 may be distributed across several machines, and the server 104 is intended to encompass such a distributed environment.

The social network application 108 may be any suitable social network application that allows a user to identify contacts (friends and/or family) such that the user can share information (images, videos, status updates, messages, etc.) with selected contacts, and can consume information (by way of the social network application 108) shared by the selected contacts. Thus, for example, the user can upload images to the social network application 108 and cause such images to be shared with contacts of the user by way of the social network application 108. Additionally, the user, through utilization of the social network application 108, can view and/or download images posted by way of the social network application 108 by identified contacts of the user. In another example, the social network application 108 can be a message/image sharing application, wherein the user can publish text and/or images, which are received by those that subscribe to information uploaded by the user. Likewise, the user can subscribe to another entity (human, business entity, organization), and receive information (text and images) posted by the other entity through use of the social network application 108.

The server 104 includes a data store 110 that comprises a plurality of images 112 that are accessible to the user of the client computing device 102 by way of the social network application 108. The data store 110 additionally includes metadata 114 that is respectively assigned to at least a subset of images in the plurality of images 112. For example, for an image in the images 112, associated metadata may include an identity of at least one person included in the image, a caption describing content of the image, a caption describing an event captured in the image, a location from which the image was captured, etc. In some social network applications, it is often desired by users thereof to assign metadata to images to indicate which of her contacts are included in such images, as the social network application 108 will then transmit notifications to those contacts to inform them that an image has been posted and that they have been identified as being included in the image.

Pursuant to an example, the plurality of images 112 in the data store 110 can be images that are accessible by way of the social network application 108 to the user of the client computing device 102. Therefore, for instance, the images 112 may include images posted by the user of the client computing device 102 to the social network application 108, as well as images posted by the contacts of the user of the client computing device 102 to the social network application 108.

Figure 2:
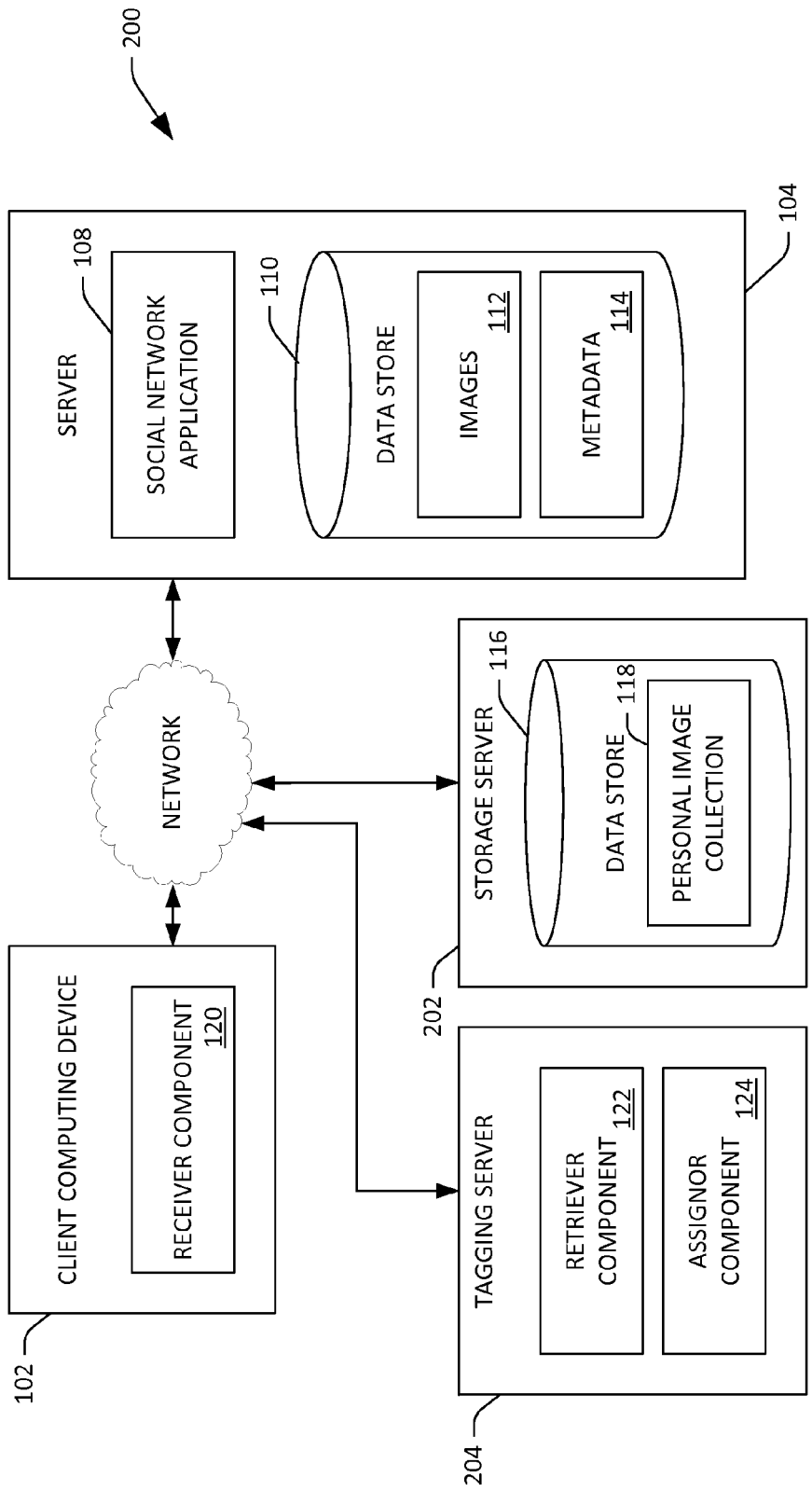
FIG. 2 is a functional block diagram of an exemplary system that facilitates automatically applying metadata to a personal image collection of a user, where the personal image collection is located external to a client-side computing device employed by a user.

The client computing device 102 includes a data store 116 that comprises a personal image collection 118 of the user of the client computing device 102. While shown in FIG. 1 as residing on the client computing device 102, it is to be understood that the personal image collection 118 may reside in one or more data stores managed by a cloud service (as shown in FIG. 2). Thus, the personal image collection 118 resides on a computing device that is external to the social network application 108. Such personal image collection 118 may include some images included in the images 112 posted by the user of the client computing device 102 by way of the social network application 108. Oftentimes, however, images in the personal image collection 118 of the user lack metadata that may be useful to the user of the client computing device 102 in connection with organizing or locating particular images in the personal image collection 118. For example, as mobile phones with cameras have become ubiquitous, and costs for mobile cameras have dropped, many people have begun to generate a relatively large number of images for inclusion in personal image collections. Therefore, for instance, the personal image collection 118 of the user of the client computing device 102 may include thousands of images, wherein such images have a relatively small amount of metadata assigned thereto, and wherein such metadata may not be useful in assisting the user of the client computing device 102 in connection with organizing or locating particular images. The personal image collection 118 may include images captured by way of a mobile telephone, images generated by scanning older images, images captured by a camera of the user of the client computing device 102, images captured by contacts of the user of the client computing device 102 that are subsequently provided to the user of the client computing device 102, etc. Therefore, it is to be understood that images in the personal image collection 118 of the user of the client computing device 102 may be generated by multiple different sources over time.

The system 100 is configured to leverage the metadata 114 associated with the images 112 in the data store 110 of the server 104 to assign metadata to images in the personal image collection 118. Again, while FIG. 1 depicts the personal image collection 118 as residing on a client device, it is to be understood that the personal image collection 118, in other embodiments, can reside in a cloud storage system or across devices. It is also to be understood that location of the personal image collection 118 may be independent of how the images were captured/created. The client computing device 102 includes a receiver component 120 that receives an indication (e.g., from the user of the client computing device 102) that at least one image in the personal image collection 118 of the user is desirably assigned metadata based upon the images 112 and corresponding metadata 114 that are accessible to the user of the client computing device 102 by way of the social network application 108.

In an exemplary embodiment, a computer-executable application can be installed on the client computing device 102 and initiated by a user thereof, wherein the computer-executable application is configured to assist the user in assigning metadata to images in the personal image collection 118. Such application may be, for instance, a client-side image organization application that is configured to communicate with the social network application 108. In another example, such computer-executable application may be installed as a browser-based application or plugin that is registered with the social network application 108. In such an example, the user of the client computing device 102 can direct her browser to the social network application 108 and select a button (e.g. in a toolbar) of the browser, thereby indicating that the automatic assignment of metadata to images in the personal image collection 118 is desired. In still yet another example, the computer-executable application can be a registered application with the social network application 108, such that from the perspective of the user of the client computing device 102, such application appears to be a portion of the social network application 108. In another example, the application may be a plug-in to a cloud-based tagging service. The latter two exemplary embodiments may be particularly well-suited for instantiations where metadata is automatically applied to images in the personal image collection through employment of a cloud service (which will be shown and described with reference to FIG. 2). Other embodiments are also contemplated.

The client computing device 102 may also include a retriever component 122 that, responsive to the receiver component 120 receiving the indication that the at least one image in the personal image collection 118 of the user is desirably assigned metadata based upon the images 112 and corresponding metadata 114 in the data store 110, can retrieve the images 112 and the metadata 114 corresponding thereto by way of the social network application 108. For example, the retriever component 122 can cause the images 112 and associated metadata 114 to be downloaded to the client computing device 102 (or to a cloud storage system or cloud service) by way of the network 106.

Pursuant to an example, responsive to the receiver component 120 receiving the aforementioned indication that metadata is desirably assigned to images in the personal image collection 118, the retriever component 122 can transmit authentication data for the user of the client computing device 102 to the social network application 108 by way of the network 106. Such authentication data can be, for example, a username and password of the user of the client computing device 102 for the social network application 108. The social network application 108 may then authenticate the user, and can transmit data to the client computing device 102 indicating that the user has been authenticated. Receipt of such an authenticated connection can cause the retriever component 122 to transmit a query to the social network application 108, wherein the query is configured to retrieve the images 112 and corresponding metadata 114 in the data store 110. For example, the query transmitted by the retriever component 122 can indicate to the social network application 108 that tagged images of the user and his/her contacts posted to the social network application 108 by the user of the client computing device 102 are desirably retrieved, as well as images posted by contacts of the user of the client computing device 102 (as registered in the social network application 108) made accessible to the user of the client computing device 102. Optionally, additional filters based on date, event type or any other metadata (attached to the photos in the social network) may be used.

Responsive to the images 112 and the corresponding metadata 114 being retrieved by the retriever component 122, an assignor component 124 can assign metadata to at least one image in the personal image collection 118 based upon content of images 112 retrieved by the retriever component 122 and metadata from the metadata 114 that corresponds to such content. In an exemplary embodiment, the assignor component 124 can analyze the images 112 and corresponding metadata 114 to train a face recognition algorithm, such that the face recognition algorithm can identify a face of least one person included in at least one image in the images 112. Furthermore, based upon metadata assigned to the at least one image, the assignor component 124 can determine an identity that corresponds to the face. For instance, an image in the images 112 can have a tag assigned thereto that indicates that a person identified as "John Smith" is included in such image (wherein the tag may further indicate a portion of the image that includes "John Smith"). A face model can be learned for John Smith based upon the images 112 and the corresponding metadata 114, wherein the face model comprises values for features that are indicative of facial features of the person identified as John Smith. The assignor component 124 can thereafter analyze images in the personal image collection 118 for faces that correspond to such face model. For images identified in the personal image collection 118 as including John Smith, the assignor component 124 can assign metadata (tags) to such images in the personal image collection 118 that indicate that those images include John Smith.

As will be understood, a number of the images 112 in the data store 110 may be relatively large, as such images 112 not only include images posted by the user of the client computing device 102, but also by contacts thereof. Accordingly, presuming that images in the personal image collection 118 include images that capture several contacts of the user, it can be appreciated that the assignor component 124 can automatically assign a relatively large amount of metadata to the personal image collection 118. Accordingly, in an exemplary embodiment, the user of the client computing device 102 may select a particular contact or set of contacts, and the images 112 and corresponding metadata 114 can be analyzed for only the selected contacts (rather than all contacts of the user). Therefore, the assignor component 124 can assign metadata to images in the personal image collection 118 only to images where the selected contacts are relevant.

The client computing device 102 may further include a sharer component 126 that, subsequent to the assignor component 124 assigning metadata to at least one image in the personal image collection 118, can receive an indication from the user of the client computing device 102 that the at least one image is desirably shared by way of the social network application 108. For example, the sharer component 126 can output a graphical indication of images that have been assigned metadata by the assignor component 124, and the user of the client computing device 102 may then select which of such images is desirably shared by way of the social network application 108. Responsive to the sharer component 126 receiving an indication from the user of the client computing device 102 that one or more images are desirably shared, the sharer component 126 can cause such images to be uploaded to the social network application 108 by way of the network 106.

The client computing device 102 may also optionally comprise an index generator component 128 that can index images in the personal image collection 118 of the user of the client computing device 102 as well as images retrieved by the retriever component 122 (the images 112 from the data store 110 on the server 104) in a common index, wherein the index generator component 128 can index such images by metadata corresponding thereto. Therefore, while the images 112 retrieved by the retriever component 122 may not be permanently retained on the client computing device 102, and thus may not be included in the personal image collection 118 of the user of the client computing device 102, the index generator component 128 can index such images 112 together with the images in the personal image collection 118 by metadata corresponding thereto. For example, if the metadata identifies people included in the images, then the index generator component 128 can index images in the personal image collection 118 and the images 112 retrieved by way of the social network application 108 in a common index by people included in such image. The index generator component 128 may then cause the common index to be retained in the data store 116 of the client computing device 102.

The client computing device 102 may also include a search component 130 that receives a query and executes the query over the aforementioned common index. The search component 130 may then output search results responsive to executing the query over the common index, wherein the search results can include both images in the personal image collection 118 of the user as well as images (or links to images) from the images 112 accessible to the user by way of the social network application 108 (even though such images are not retained locally at the client computing device 102). Therefore, if the user sets forth the query "John Smith," the search component 130 will identify images in the personal image collection 118 that include John Smith as well as images in the images 112 accessible to the user by way of the social network application 108 that include John Smith.

While the assignor component 124 has been described above as assigning metadata that indicates identities of people included in images, it is to be understood that the assignor component 124 is not so limited. For example, the assignor component 124 can be configured to perform scene analysis and assign metadata that is indicative of a location and/or event based upon such analysis. For instance, if an image from the images 112 includes metadata that indicates that such image corresponds to "2010 Birthday", and the assignor component 124 identifies an image in the personal image collection 118 that is of a very similar scene, then the assignor component 124 can likewise assign the metadata "2010" to such image. Other types of metadata that can be assigned to images in the personal image collection 118 based upon the images 112 and corresponding metadata 114 include comments assigned to images in the images 112, captions assigned to images in the images 112, etc.

While FIG. 1 illustrates an exemplary embodiment, where the client computing device 102 is shown as retaining the personal image collection 118 and components for associating metadata with images in the personal image collection 118, it is to be understood (as will be described in greater detail below) that other embodiments are also contemplated. For example at least one of the retriever component 122, the assignor component 124, the sharer component 126, the index generator component 128, or the search component 130 can reside on a computing device employed by a cloud-based service for associating metadata with images. In other embodiments, the personal image collection 118 may additionally or alternatively be retained on a computing device employed by a cloud-based service.

Now referring to FIG. 2, another exemplary system 200 that facilitates assignment of metadata to images in the personal image collection 118 based upon the images 112 and corresponding metadata 114 that are accessible to the user of the client computing device 102 by way of the social network application 108 is illustrated. In the system 100 (FIG. 1), the personal image collection 118 is shown as residing in a data store 116 of the client computing device 102. In some embodiments, however, cloud services are provided for hosting images and other files, rather than or in addition to the images and other files being retained on the client computing device 102, wherein the user of the client computing device 102 can upload and download images from the personal image collection 118. Additionally, the client computing device 102 may be a relatively thin computing device with constrained resources, such as a mobile telephone or tablet computing device. Accordingly, the system 200 includes a storage server 202 that is accessible by the client computing device 102 by way of the network 106. The storage server 202 includes the data store 116, which retains the personal image collection 118. The storage server 202 may also optionally include the sharer component 126 and/or the search component 130. The storage server 202 can be a portion of a cloud storage service or a separate computing service. In another example, the storage server 202 may be included in an on-premise service.

In the exemplary embodiment shown in FIG. 2, the system 200 further comprises a tagging server 204, which includes the retriever component 122 and the assignor component 124. The tagging server 204 may also optionally include the index generator component 128. It is to be understood, however, that the above-mentioned components and the personal image collection 118 can be distributed between the client computing device 102, the storage sever 202, and the tagging server 204 in any suitable manner. The retriever component 122 can retrieve the images 112 and associated metadata 114 from the server 104, and the assignor component 124 can train a recognition algorithm (e.g., a face recognition algorithm) on the tagging server 204. The trained face recognition algorithm may then be provided to the storage server 202, where it can be executed over the personal image collection 118, such that images therein can be assigned metadata in the personal image collection 118 based upon the images 112 and metadata 114 corresponding thereto.

The user of the client computing device 102 can indicate that images in the personal image collection 118 are desirably assigned metadata based upon the images 112 and corresponding metadata 114 accessible to the user by way of the social network application 108. The retriever component 122 can receive such indication from the receiver component 120, and can cause the images 112 and corresponding metadata 114 to be retrieved from the server 104. In other embodiments, the retriever component 122 can reside on the client computing device 102, such that the images 112 and corresponding metadata 114 are downloaded to the client computing device 102 by way of the network 106, and subsequently uploaded to the tagging server 204. The assignor component 124, as described above, analyzes the images 112 and corresponding metadata 114 and assigns metadata to images in the personal image collection 118 based upon the images 112 and the corresponding metadata 114.

Figure 3:
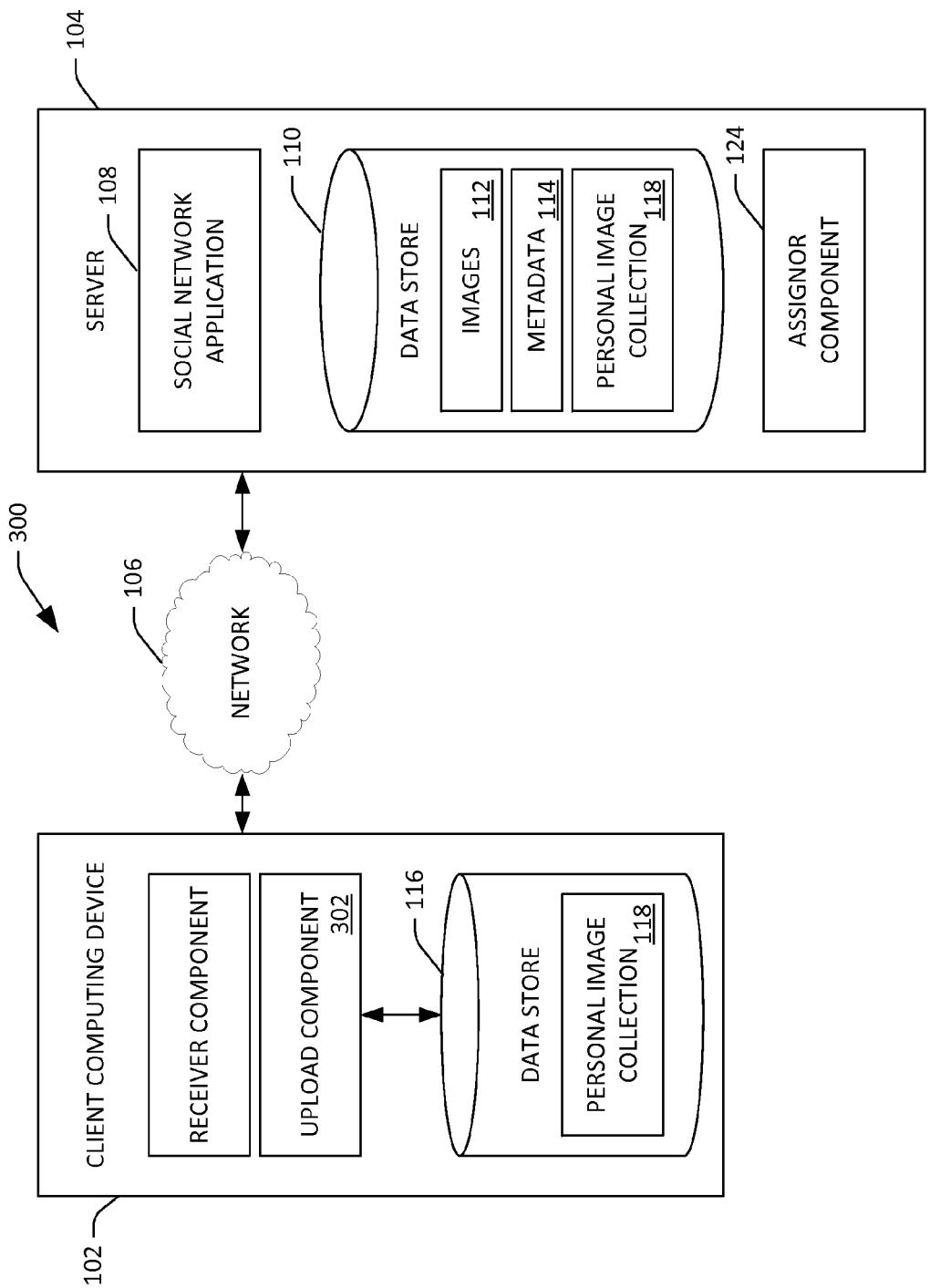
FIG. 3 is a functional block diagram of an exemplary system that facilitates application of metadata to images in a personal image collection of a user.

Now referring to FIG. 3, another exemplary system 300 that facilitates assigning metadata to images in the personal image collection 118 of the user based upon the images 112 and associated metadata 114 accessible to the user by way of the social network application 108 is illustrated. In the system 300, a common entity hosts the social network application 108 and provides a computer-executable application for execution on the client computing device 102 for organizing images in the personal image collection 118. The common entity may also optionally provide a network-based service for hosting the personal image collection 118 of the user. It is to be understood, however, that the personal image collection 118 is at least logically separate from the social network application 108 (e.g., the social network application does not retain, process or publish images in the personal image collection 118).

In the system 300, the receiver component 120 receives an indication from a user of the client computing device 102 that metadata is desirably assigned to images in the personal image collection 118 of the user based upon the images 112 and metadata 114 accessible to the user by way of the social network application 108. The client computing device 102 may further include an upload component 302 that, responsive to the receiver component 120 receiving the indication, can authenticate to the social network application 108. Responsive to being authenticated, the upload component 302 can cause the personal image collection 118 of the user to be uploaded to the server 104. Again, in this embodiment, a common entity provides an image organization application for execution on the client computing device 102 as well as the social network application 108.

The personal image collection 118 is thus uploaded to the data store 110 of the server 104. The assignor component 124 can act, as described above, by analyzing the images 112 and the associated metadata 114 accessible to the user of the client computing device 102 by way of the social network application 108, and can assign metadata to images in the personal image collection 118 based upon such analysis. The assignor component 124 may then cause the metadata assigned to images in the personal image collection 118 to be transmitted back to the client computing device 102, where it can be retained in the data store 116 in relation to images in the personal image collection 118. In another embodiment, the assignor component 124 can cause an entirety of the personal image collection 118 to be transmitted back to the client computing device 102 by way of the network 106, including newly added metadata. Optionally, the assignor component 124 can cause the personal image collection 118 to be removed from the server 104. Alternatively, the user of the client computing device 102 may desire that the personal image collection be backed up on the server 104 and can cause the personal image collection 118 to be one retained on the server 104 (but not accessible by way of the social network application 108).

Figure 4:
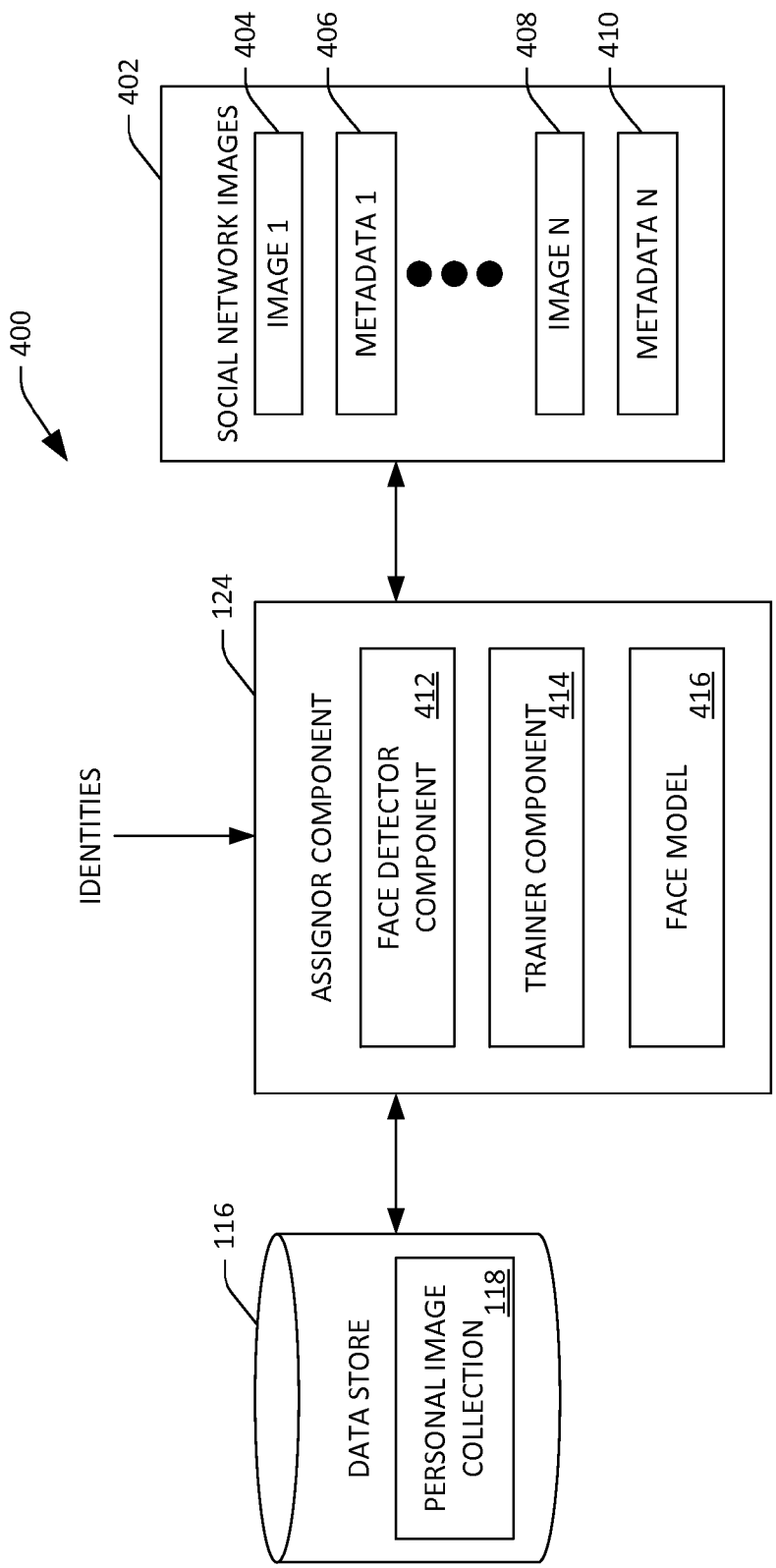
FIG. 4 is a functional block diagram of an exemplary system that facilitates training a face recognition algorithm based upon images and metadata accessible to a user by way of a social network application.

Now referring to FIG. 4, an exemplary system 400 that facilitates assigning metadata that indicates an identity of at least one person captured in an image in the personal image collection 118 is illustrated. The system 400 includes the assignor component 124, which receives an identity of at least one person, wherein images in the personal image collection 118 that include such person are desirably tagged to indicate that the at least one person is included in such images. In an example, the identity of the at least one person can be the identity of that person as set forth in the social network application 108. Thus, for example, the identity of the at least one person can be a registered contact of the user of the client computing device 102 in the social network application 108. The assignor component 124 may also optionally receive an indication of a portion of the personal image collection 118 that is desirably subjected to addition of metadata. For instance, the user of the client computing device 102 may wish that only a particular folder or album amongst numerous folders or albums have images therein have metadata assigned thereto.

Responsive to receiving the identity of the at least one person, the assignor component 124 can ascertain if a face model has been built (and is complete) for such person. A face model can be deemed complete if some threshold number (e.g. 20, 30, ...) of positively identified faces of the at least one person have been identified in images utilized to build such face model. If a face model for the at least one person has not been built, the assignor component 124 can undertake an unsupervised loop for obtaining positive faces of the at least one person in the images 112 by leveraging explicit input about the people to learn from a user of the client device.

To obtain the positive faces of the at least one person, the assignor component 124 accesses images/metadata 402 that are accessible to the user of the client computing device 102 by way of the social network application 108. The images/metadata 402 can be considered a combination of the images 112 and corresponding metadata 114 described above. The images/metadata 402 include a first image 404 with first metadata 406 assigned thereto, through an Nth image 408 with Nth metadata 410 assigned thereto. The assignor component 124 analyzes the images/metadata 402 to locate an image that has metadata associated therewith that includes that the at least one person is included in the image.

The assignor component 124 includes a face detector component 412 that is configured to detect faces in images. Thus, the face detector component 412, for the image located by the assignor component that is believed to include the at least one person, detects faces in such image. In some embodiments, the social network application 108 employs a bounding box of a certain size to allow users thereof to identify portions of images that include certain people. If the face detector component 412 ascertains that a detected face in the obtained image is within some threshold distance of the bounding box assigned by the social network application 108, the assignor component 124 can label such face as being a candidate face for the at least one person. It can be noted that since the face detector component 412 is configured to detect faces, objects that are tagged in the image (incorrectly) as being respective persons are automatically discarded. This process can repeat for multiple images in the images/metadata 402, such that numerous candidate faces for the at least one person are potentially located. The assignor component 124 also includes a trainer component 414 that generates face features for each candidate face for the at least one person. With more particularity, a feature set can be employed to act as a signature for human faces, wherein for a particular face, values can be assigned to entries in the feature set to indicate whether the face in the image includes features corresponding to the entries. For each candidate face for the at least one person, the trainer component 414 populates a respective feature set. The trainer component 414 can subsequently generate clusters based upon feature sets of candidate faces, wherein clusters include similar feature sets (where similarity can be defined by a distance between two feature sets). The trainer component 414 then selects the largest cluster of feature sets, which can assist in removing incorrectly tagged faces. Each feature set in the cluster can be labeled as a positive face for the at least one person.

The trainer component 414 may then build a face model 416 for the at least one person based upon feature sets of the face of the at least one person as captured in numerous images. The model can be identified as being complete if some threshold number of positive faces are identified as being the at least one person. If an adequate number of positive faces are unavailable, a partial face model can be learned, which may be improved over time as additional tags are assigned the at least one person in the images/metadata 402. The face model 416 may optionally be augmented with at least one feature set from a face that is known not to be the face of the at least one person. Furthermore, the trainer component 414 can update the face model 416 based upon explicit feedback from the user of the client computing device 102. For instance, a user can be provided with an interface that allows the user to correct tags (if a tag automatically applied is found to be incorrect). The interface may also allow the user to complete an incomplete tag or otherwise modify a tag. The input set forth by the user can be employed by the trainer component 414 to update/learn the face model 416. The completed face model 416 thus may include the identity assigned to the at least one person by the social network application 108, features associated with the at least one person (the positive faces from the images/metadata 402), and features associated with one or more negative faces.

The assignor component 124 may then employ the face model 416 in connection with identifying images in the personal image collection 118 that includes the at least one person. For example, for each image in the personal image collection 118, the face recognition component 412 can search for respective faces therein. If the face recognition component 412 detects a face, then the face recognition component 412 can generate a bounding box for the face. The face recognition component 412 can then extract values for a feature set for the detected face, and compare the feature set with the face model 416. If the face recognition component 412 determines that the feature set sufficiently corresponds to the face model 416 (e.g., with some threshold level of confidence), then the assignor component 124 can assign a tag to a respective image that includes the face, indicating that the image includes the at least one person (and optionally the location in the image where the at least one person is included). Additionally, the assignor component 124 may request user feedback if it is believed that the face in the image belongs to the at least one person, but the confidence is below some predefined threshold. The face model 416 may then be updated based upon such feedback. The process set forth above can be repeated for each image in the personal image collection 118, and for each person identified by the user, wherein images that include a respective person are desirably tagged.

Figure 5:
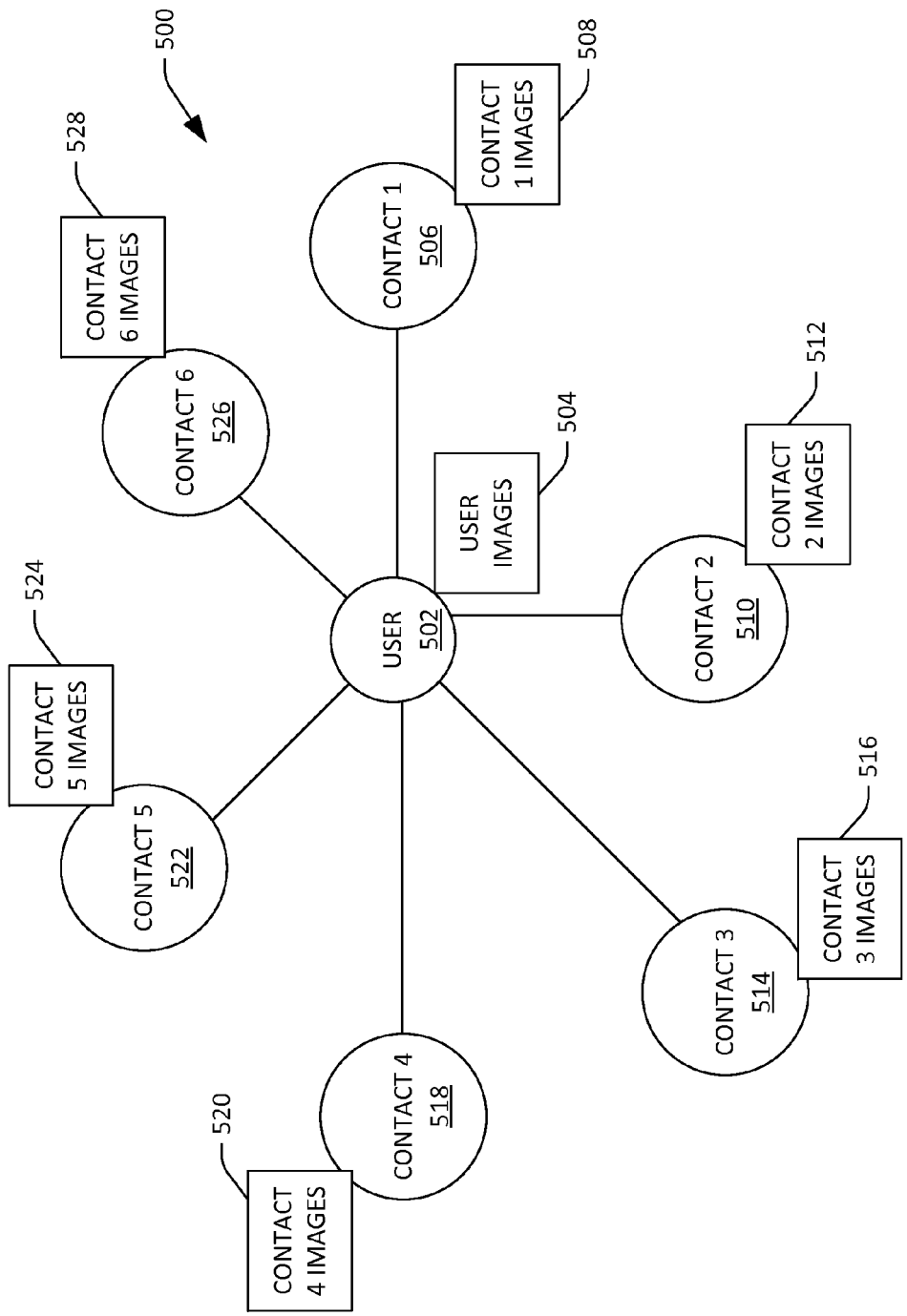
FIG. 5 illustrates an exemplary social graph of a user that can be analyzed to retrieve images by way of a social network application.

Now referring to FIG. 5, an exemplary social graph of the user of the client computing device 102 is illustrated, wherein such social graph 500 can be traversed to retrieve images and corresponding metadata. The social graph 500 is maintained by the social network application 108. In this example, a user 502 is shown as being at the center of the social graph 500, wherein the user 502 is the user of the client computing device 102. In the social network application 108, the user has posted user images 504 to the social network application 108. In the social graph 500, the user 502 is shown as having a first contact 506. The first contact 506 may have posted first contact images 508 by way of the social network application 108. In an exemplary embodiment, the first contact images 508 may be any images posted by the first contact 506 that are accessible to the user 502. In other embodiments, the first contact images 508 may be only those images posted by the first contact 506 that are available to the general public.

The social graph 500 illustrates that the user 502 has a second contact 510 that has posted second contact images 512, a third contact 514 that has posted third contact images 516, a fourth contact 518 that has posted fourth contact images 520, a fifth contact 522 that has posted fifth contact images 524, and a sixth contact 526 that has posted sixth contact images 528. When the retriever component 122 retrieves images by way of the social network application 108, for instance, the retriever component 122 can retrieve the user images 504, the first contact images 508, the second contact images 512, the third contact images 516, the fourth contact images 520, the fifth contact images 524, and the sixth contact images 528 that are relevant to at least one specified person (e.g., the images retrieved by the retriever component 122 have metadata assigned thereto that indicates that the at least one specified person is included therein).

Figure 6:
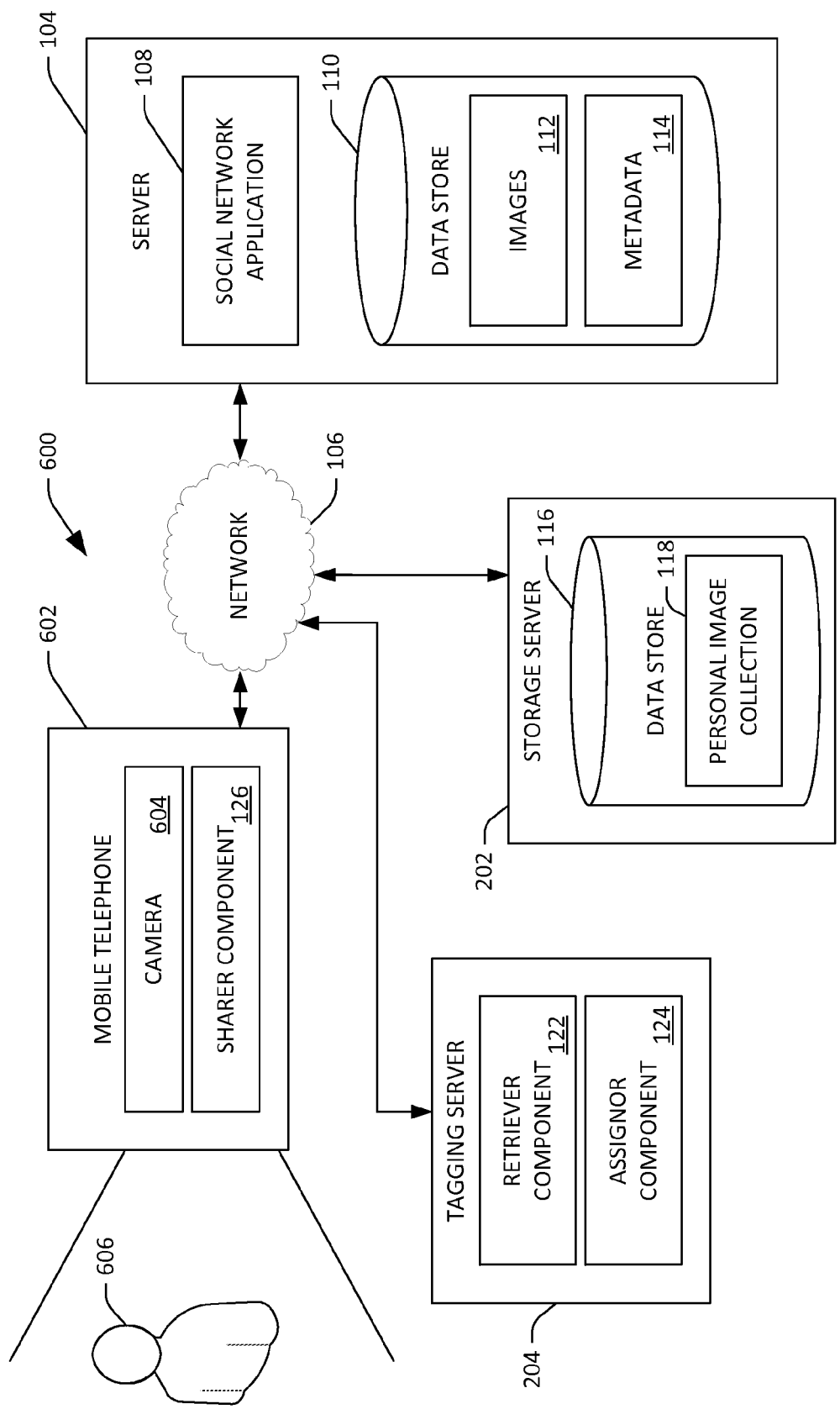
FIG. 6 is a functional block diagram of an exemplary system that facilitates application of metadata to a captured image prior to such image being uploaded to a social network application.

Now referring to FIG. 6, an exemplary system 600 that facilitates posting an image that comprises metadata to the social network application 108 is illustrated. The system 600 is shown as including a mobile telephone 602, which comprises a camera 604. The camera 604 is employed to capture an image that includes at least one person 606. The mobile telephone 602 further includes a data store (not shown) and the image of the at least one person 606 can optionally be retained locally in the data store of the mobile telephone 602.

The mobile telephone 602 can be configured to upload images captured by the camera 604 to the storage server 202. Such uploading may occur automatically, or responsive to receipt of a command from a user of the mobile telephone 602. The image that includes that at least one person 606 can thus be uploaded to the storage server 202, and can be retained as an image in the personal image collection 118 in the data store 116. For instance, the storage server 202 can be a portion of a cloud-based data retention service. In the exemplary embodiment shown here, the tagging server 204 includes the assignor component 124, which can access the image captured by the camera 604 that includes the person 606 responsive to such image being placed on the storage server 202 or in response to a command set forth by the user of the mobile telephone 602. The assignor component 124 can automatically assign metadata to the image that indicates that the person 606 is included in the image. As mentioned above, the assignor component 124 can assign such metadata based at least in part upon a face model for the at least one person 606 learned through analysis of the images 112 and corresponding metadata 114 that are accessible to the user of the mobile telephone 602 by way of the social network application 108. In an exemplary embodiment, subsequent to the assignor component 124 associating metadata with the image that includes the person 606, the metadata and the image can be transmitted to the storage server 202 and/or the mobile telephone 602, where the tagged image can be stored locally on the mobile telephone 602.

The mobile telephone 602 additionally includes the sharer component 126 that can cause the tagged image to be uploaded to the social network application 108 by way of the network 106 (e.g., from the mobile telephone 602 or from the storage server 202, depending upon where the tagged image is retained). For example, subsequent to the user of the mobile telephone 602 capturing the image that includes the person 606, the assignor component 124 can identify that the person 606 is a contact of the user of the mobile telephone 602 in the social network application 108. The assignor component 124 may then prompt the user of the mobile telephone 602 to upload the captured image to the social network application 108 with tags that identify that the person 606 is included in the image.

In another exemplary embodiment, rather than immediately prompting the user, the user of the mobile telephone 602 can be prompted by the sharer component 126 to share the image responsive to the user of the mobile telephone 602 accessing the image (e.g., either locally from the mobile telephone 602 or from the storage server 202). In this embodiment, it can be ascertained that tags assigned to images that include the person 606 by the user of the mobile telephone 602 and/or other users of the social network application 108 can be leveraged to allow for the automatic tagging of captured images without requiring a significant amount of manual effort on the part of the user of the mobile telephone 602.

FIGS. 7-10 illustrate exemplary methodologies relating to application of metadata to images in a personal image collection of a user. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 7:
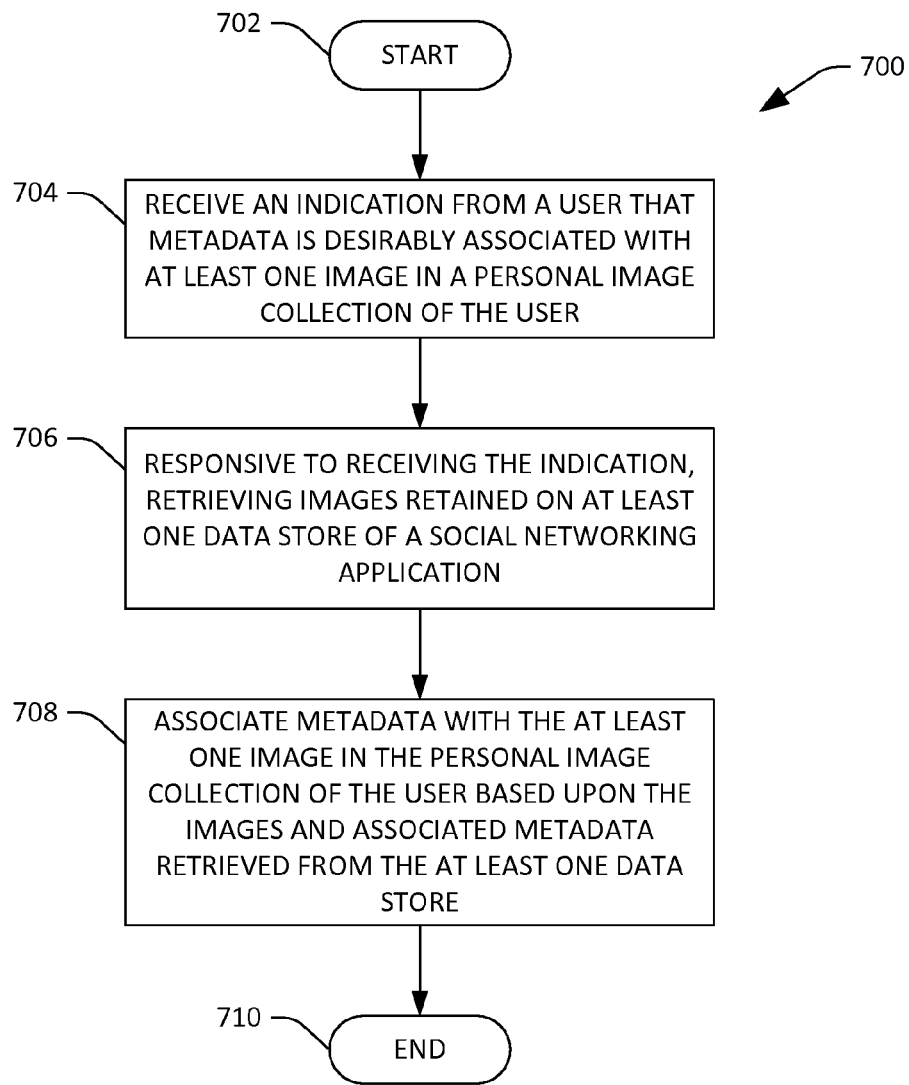
FIG. 7 is a flow diagram that illustrates an exemplary methodology for applying metadata to an image in a personal image collection of a user based upon images retrieved from a data store of a social network application.

Turning now to FIG. 7, an exemplary methodology 700 that facilitates association of metadata with at least one image in a personal image collection of the user is illustrated. The methodology 700 starts at 702, and at 704 an indication from a user is received that metadata is desirably associated with at least one image in a personal image collection of the user. At 706, responsive to receiving the indication, images retained on at least one data store of a social network application are retrieved, wherein the images are accessible from an account of the social network application of the user and have metadata associated therewith. Such metadata may include comments, identities of objects in images, identities of people in images, etc. It is to be understood that the images in the personal image collection are retained in storage that is external to the social network application.

At 708, metadata is associated with at least one image in the personal image collection of the user based upon the images and associated metadata retrieved from the at least one data store of the social network application. The methodology 708 completes at 710.

Figure 8:
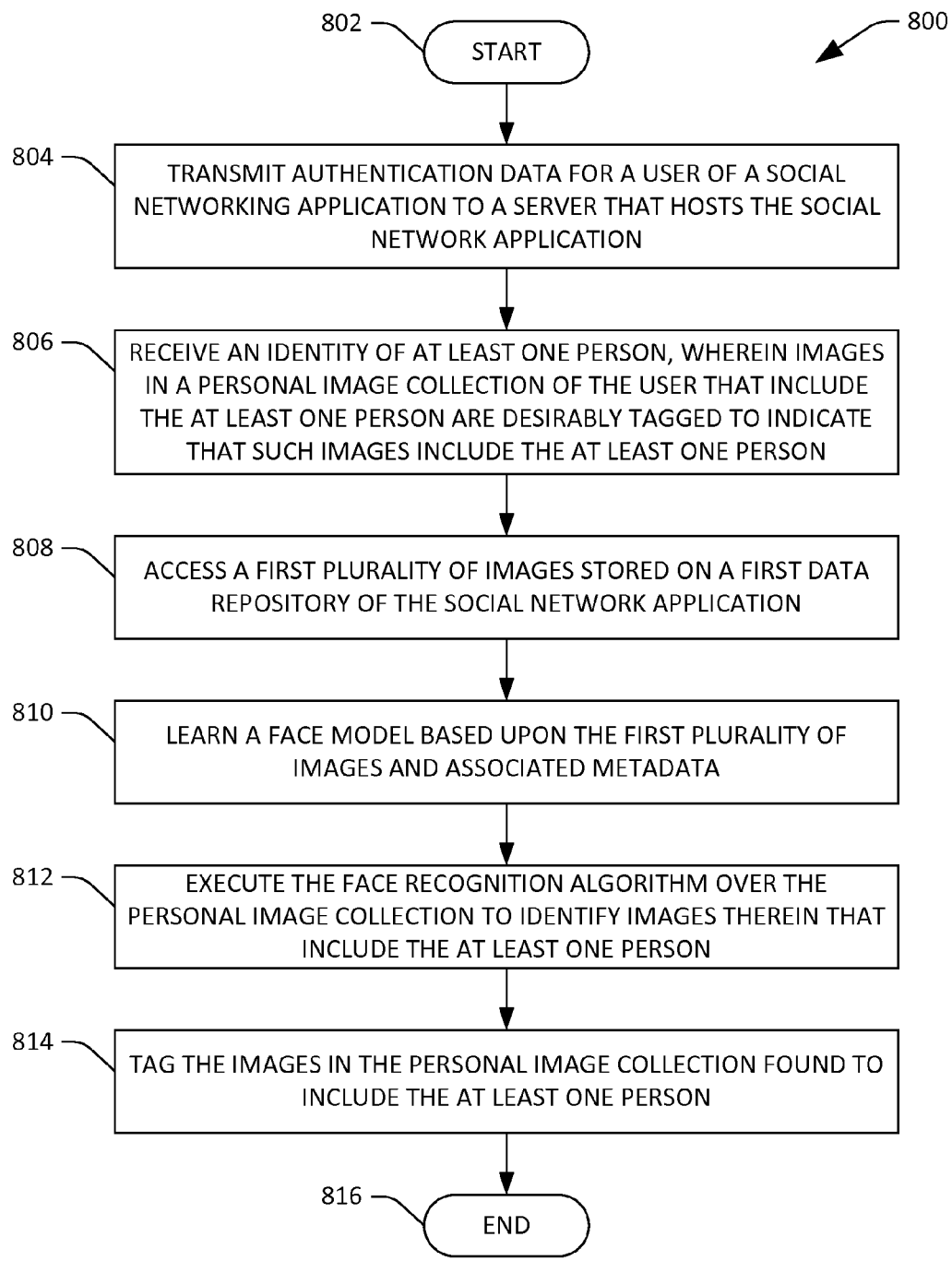
FIG. 8 is a flow diagram that illustrates an exemplary methodology for applying a tag to an image in a personal image collection of a user to identify at least one person that is captured in the image.

Now referring to FIG. 8, another exemplary methodology 800 that facilitates automatically assigning a tag to an image to indicate that at least one person is included in the image, wherein the image is in a personal image collection of the user, is illustrated. The methodology 800 starts at 802, and at 804 authentication data for a user of a social network application is transmitted to a server that hosts the social network application. As noted above, such authentication data may be a username and password, although other authentication data, such as a voice signal, a fingerprint, or the like, is contemplated.

At 806, an identity of at least one person is received, wherein images in a personal image collection of the user that include the at least one person are desirably tagged to indicate that such images include the at least one person. In an example, the at least one person may be a contact of the user in the social network application.

At 808, responsive to receipt of the identity of the at least one person, a first plurality of images stored on a first data repository of the social network application are accessed, wherein the first plurality of images have metadata assigned thereto that indicates that the at least one person is included in each image in the first plurality of images. For instance, the first plurality of images can be downloaded to a client computing device employed by the user or to a cloud service performing the assignation of metadata to images in the personal image collection of the user.

At 810, a face model for the at least one person is learned based at least in part the images accessed at 808 and metadata assigned thereto.

At 812, a face recognition algorithm is executed over the personal image collection of the user to identify images therein that include the at least one person. With more particularity, the face recognition algorithm can detect, in each image to be analyzed in the personal image collection, face(s) in a respective image. The face recognition algorithm may then compare the detected face(s) with the learned face model to ascertain if any of the face(s) is the at least one person represented by the learned face model. At 816, images in the personal image collection found to include the at least one person are assigned tags to indicate that the images include such person. The methodology 800 completes at 816.

Figure 9:
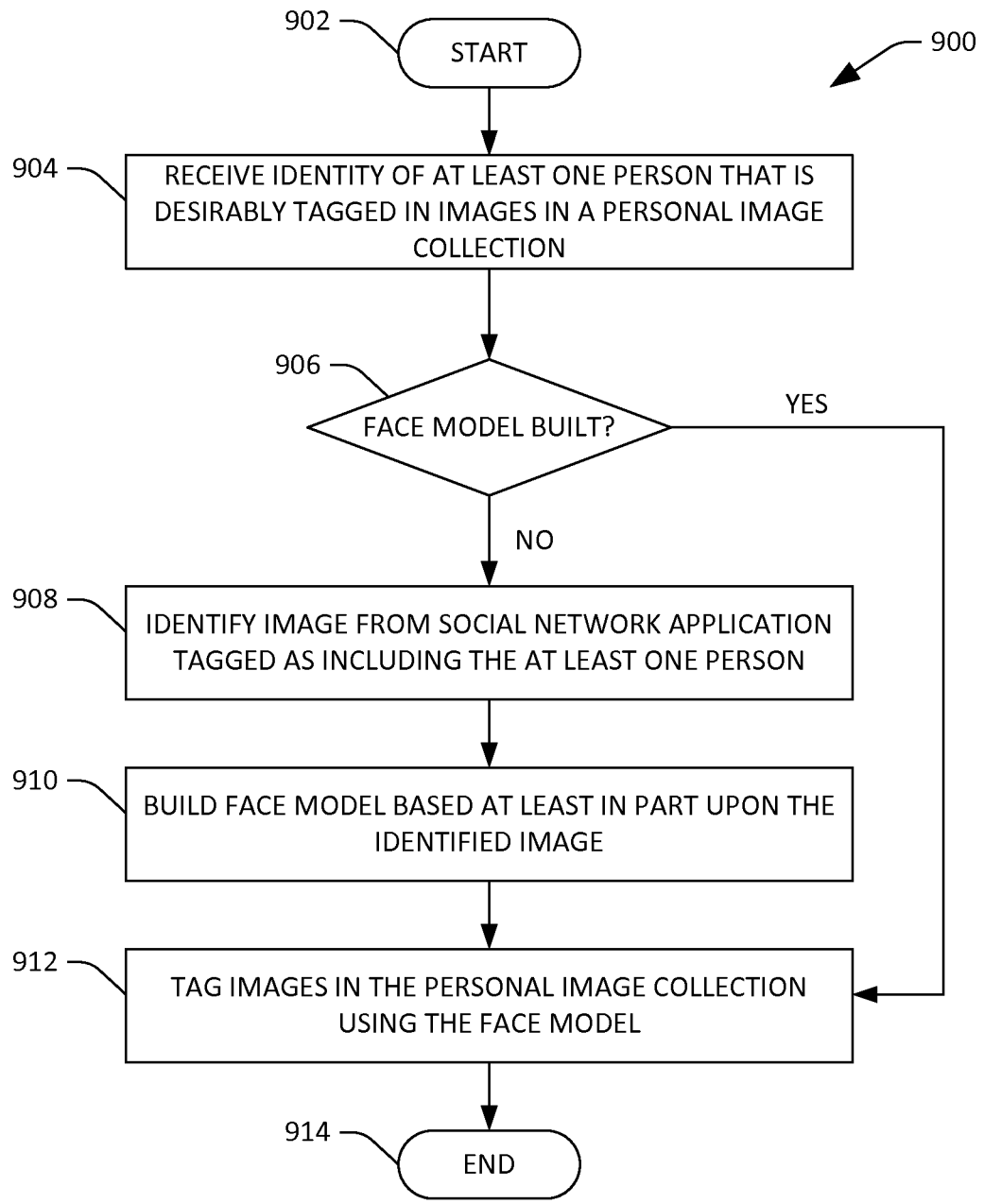
FIG. 9 is a flow diagram that illustrates an exemplary methodology for training a face recognition algorithm based upon images accessible by way of a social network application and metadata corresponding thereto.

Turning now to FIG. 9, an exemplary methodology 900 for building a face model based upon tagged images in a social network application is illustrated. The methodology 900 starts at 902, and at 904, an identity of at least one person that is desirably tagged in images in a personal image collection of the user is received. Such identity may correspond to the identity of a contact of the user as indicated in a social network application.

At 906, a determination is made regarding whether a face model (e.g., a complete face model based upon some threshold number of positively identified faces) has been built for the at least one person that is desirably tagged in images in the personal image collection of the user. If at 906 it is determined that a complete face model has not been built, then an image posted to the social network application that is accessible to the user that is tagged as including the at least one person is identified. If there are multiple images tagged as including the at least one person, then at 908 each of such images can be identified or a threshold number of such images can be identified. At 910, a face model is built based at least in part, upon the identified image. For instance, a face recognition algorithm can identify the face in the at least one image and features of the face in a bounding box can be extracted. The face model can be built based at least in part upon such extracted features. Subsequent to the face model being built, or if it was determined at 906 that the face model had already been built, then at 912, images in the personal image collection of the user that are identified as including the at least one person using the face model are tagged as including the at least one person. The methodology 900 completes at 914.

Figure 10:
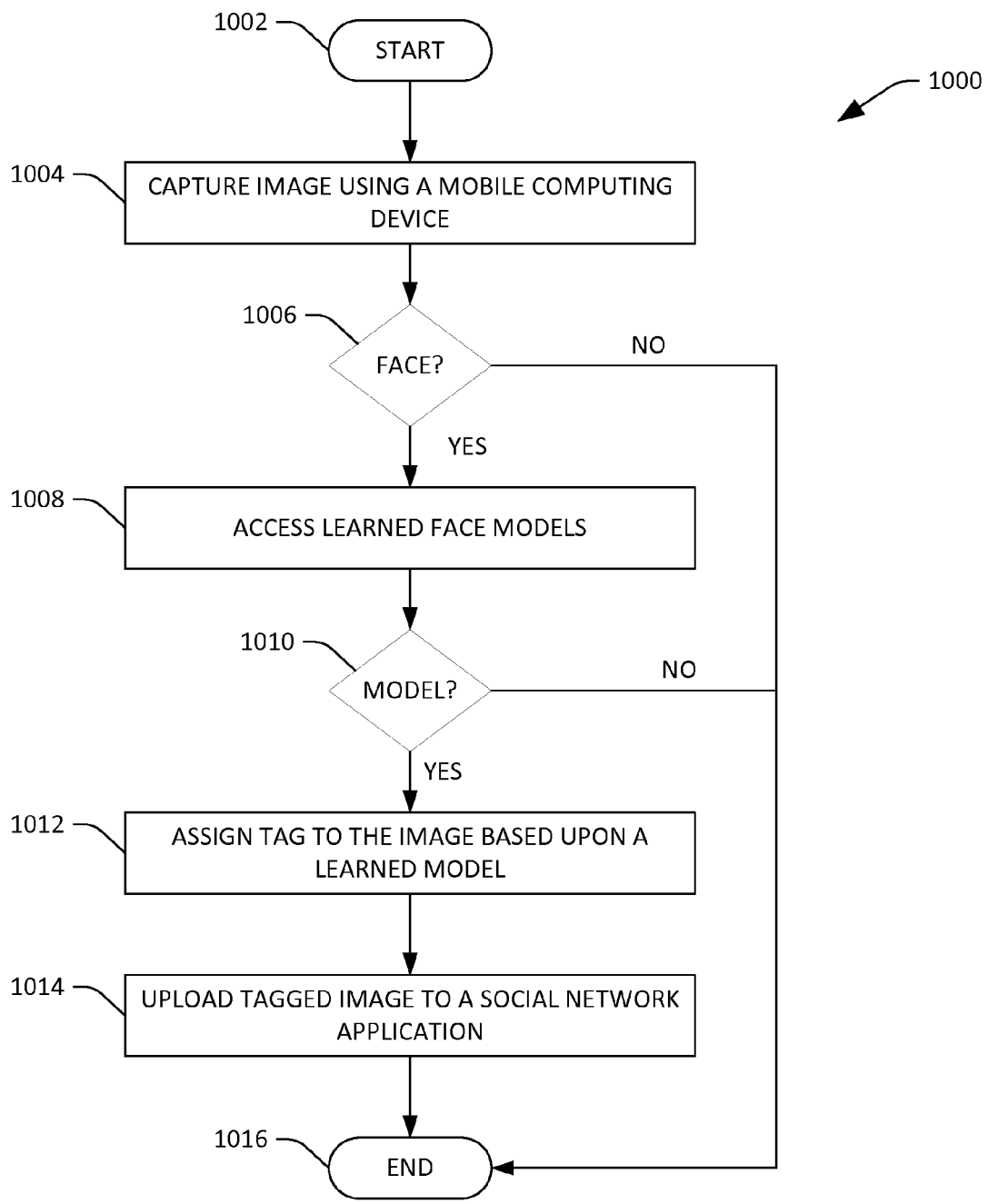
FIG. 10 is a flow diagram that illustrates an exemplary methodology for assigning metadata to an image captured by way of a mobile computing device and uploading such image, with the metadata assigned thereto, to a social network application.

Now referring to FIG. 10, an exemplary methodology 1000 for tagging and uploading an image to a social network application is illustrated. The methodology 1000 starts at 1002, and at 1004 an image is captured using a mobile computing device. Such mobile computing device may be a dedicated camera, a mobile telephone, a tablet or slate computing device, a mobile media player that includes a camera, etc. At 1006, the image is analyzed to ascertain if the image includes a face. If it is determined at 1006 that the image includes a face, then at 1008 learned face models corresponding to contacts of the user of the mobile computing device (as registered with a social network application) are accessed. As noted above, such face models can be learned based upon images accessible to the user of the mobile computing device by way of a social network application that have metadata assigned thereto. Also these face models can be learnt in a cloud service and downloaded to the mobile device At 1010, a determination is made regarding whether the face identified as being included in the image at 1006 corresponds to a learned model. In other words, a face recognition algorithm checks the face identified at 1006 against each learned model to ascertain whether such face corresponds to a previously learned model.

At 1012, a tag is assigned to the image based upon the learned model. Hence, if it is determined that the face belongs to a contact of the user for which a model of the face of the user has been learned, then at 1012 a tag is assigned to the image to indicate that the person corresponding to the learned model has been captured in the image. It is to be understood that if the assigned tag is incorrect, then the user can edit, add, or delete tags manually, and the face model can be updated based upon the input from the user. At 1014, the tagged image is uploaded to a social network application. The methodology 1000 completes at 1016.

Figure 11:
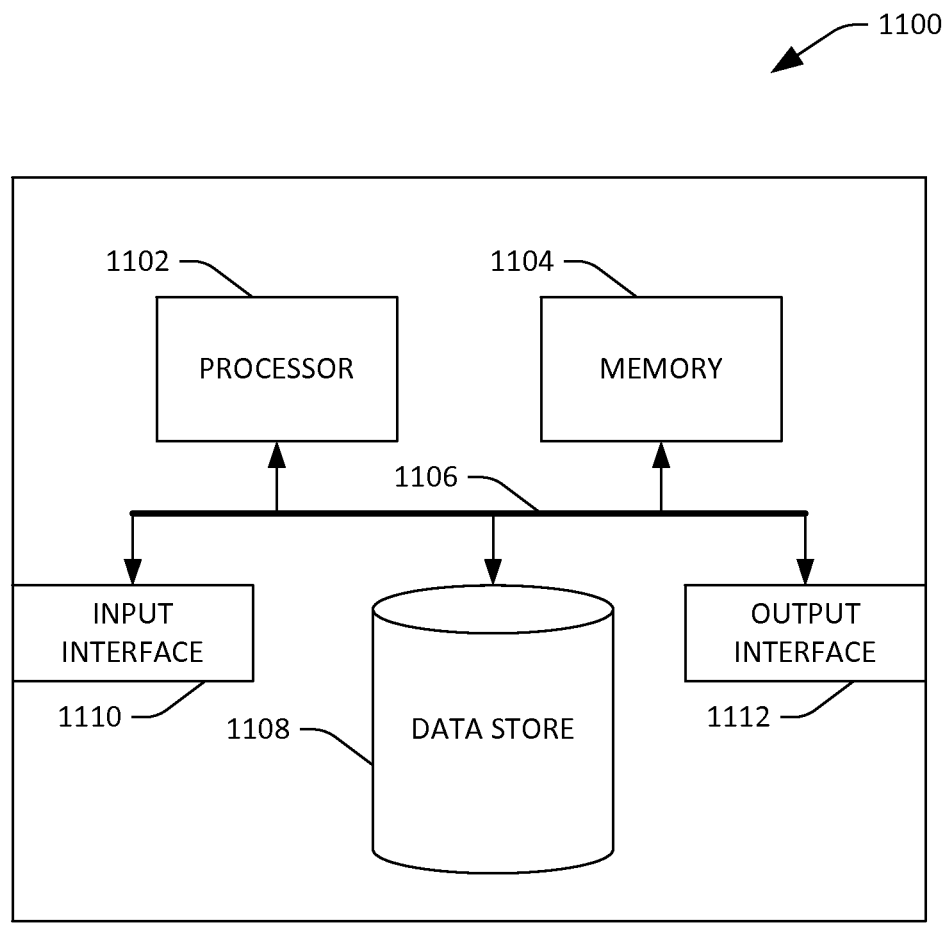
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that supports assigning metadata to images in a personal image collection of a user. By way of another example, the computing device 1100 can be used in a system that supports sharing of tagged images with contacts of a user by way of a social network application. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store images, metadata, a social network graph, etc.

The computing device 1100 additionally includes a data store 1108 that is accessible by the processor 1102 by way of the system bus 1106. The data store 1108 may include executable instructions, images, metadata, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
- receiving an indication that a tag is to be assigned at least one image in a personal image collection of a user;
- responsive to receiving the indication, accessing a data store of a social network application and retrieving:
  - images stored in the data store; and
  - tags assigned to the images stored in the data store, the images being accessible from an account of the social network application of the user, the personal image collection of the user being inaccessible by way of the social network application; and
- assigning the tag to the at least one image in the personal image collection of the user based upon the images and the tags retrieved from the data store of the social network application.

2. The method of claim 1, wherein the personal image collection is retained on a computing device in a cloud-based storage system.

3. The method of claim 1, wherein the receiving of the indication that the tag is to be assigned to the at least one image in the personal collection of the user comprises receiving an identity of a person captured in the at least one image, and wherein the images retrieved from the at least one data store of the social network application are each assigned tags that indicate that the person is likely captured in each of the images retrieved from the at least one data store of the social network application.

4. The method of claim 3, further comprising:
- learning a face model for the person based upon the images and the tags retrieved from the data store of the social network application, and wherein the assigning of the tag to the at least one image in the personal image collection of the user comprises:
- executing a face detection algorithm over images in the personal image collection of the user to detect faces therein;
- extracting a respective feature set from each face detected in each image of the images in the personal image collection of the user;
- comparing each feature set with the face model for the person; and
- identifying that the at least one image in the personal image collection of the user includes the person based upon the comparing of a respective feature set for a respective face included in the at least one image with the face model.

5. The method of claim 4, wherein the learning of the face model comprises executing an unsupervised learning algorithm that:
automatically detects positive and negative faces for a person from tagged photos retrieved from the data store of the social network application;
automatically discards incorrectly tagged faces in the tagged photos; and
updates the face model based upon new tagged photos uploaded to the social network application and explicit user tag correction feedback.

6. The method of claim 1, wherein at least one image in the images accessed on the data store of the social network application is an image posted to the social network application by a contact of the user.

7. The method of claim 1, wherein the assigning of the tag to the at least one image in the personal image collection of the user comprises applying the tag to a particular portion of the at least one image that comprises a face of a person, the tag indicating an identity of the person.

8. The method of claim 7, further comprising:
subsequent to the applying of the tag to the particular portion of the at least one image, receiving a query corresponding to the person; and
returning the at least one image responsive to receipt of the query based upon the tag applied to the particular portion of the at least one image.

9. The method of claim 1, wherein the accessing of the data store of the social network application and the retrieving the images thereon comprises traversing a social graph of the user to locate images relevant to the user that are retained on the data store of the social network application.

10. The method of claim 1, further comprising:
subsequent to the assigning of the tag to the at least one image, indexing the at least one image and another image stored on the data store of the social network application based upon respective tags assigned thereto;
subsequent to the indexing, receiving a query from the user; and
indicating to the user that both the at least one image in the personal collection of the user and the another image stored on the data store of the social network application are relevant to the query.

11. A system, comprising:
at least one processor; and
memory that stores instructions that, when executed by the at least one processor, cause the at least one processor to perform acts comprising:
receiving an indication that at least one image in a personal collection of a user is to be assigned first metadata, the first metadata to be assigned to the at least one image based upon second metadata assigned to images accessible to the user by way of a social network application, the personal collection of the user being inaccessible by way of the social network application;
responsive to receiving the indication, retrieving from at least one data store of the social network application:
the images accessible to the user by way of the social network application; and
the second metadata assigned to the images; and
responsive to retrieving the images and the second metadata, assigning the first metadata to the at least one image in the personal collection based upon:
the images accessible to the user by way of the social network application; and
the second metadata.

12. The system of claim 11, wherein the at least one image comprises a face of a person captured in the at least one image, and wherein the first metadata is a tag that identifies the at least one person.

13. The system of claim 12, wherein the second metadata comprises tags assigned to respective images in the images accessible by way of the social network application, and wherein the tags are indicative of respective identities of people captured in the images.

14. The system of claim 13, the acts further comprising learning a model of a face of the person, the model learned based upon a subset of images in the images that include tags, the tags indicate that each image in the subset of images includes the person.

15. The system of claim 11, wherein the personal collection is retained on a computing device included in a cloud-based service.

16. The system of claim 11, the acts further comprising:
receiving an indication that the at least one image and the first metadata assigned thereto is to be uploaded to the social network application; and
responsive to receiving the indication, uploading the at least one image and the first metadata assigned thereto to the social network application.

17. The system of claim 11, the acts further comprising:
indexing the at least one image in the personal collection of the user and the images accessible to the user by way of the social network application in a common index, wherein the at least one image in the personal collection of the user and the images accessible to the user by way of the social network application are indexed by respective metadata assigned thereto.

18. The system of claim 17, the acts further comprising:
executing a received query over the common index; and
outputting, based upon the query being executed over the common index, search results that comprise:
the at least one image in the personal collection of the user; and
at least one other image not in the personal collection of the user, the at least one other image accessible to the user by way of the social network application.

19. The system of claim 18, wherein a client computing device comprises the at least one processor and the memory.

20. A computer-readable storage medium comprising instructions that, when executed by a processor, cause the processor to perform acts comprising:
transmitting authentication data for a user of a social network application to a server that hosts the social network application;
responsive to the authentication data being authenticated by the social network application, accessing a first plurality of images stored on a first data repository of the social network application, wherein a first image in the first plurality of images has a tag assigned thereto, the tag identifies a person included in the first image;
analyzing the first plurality of images to learn a face model for the person, wherein the face model is learned based upon the first image and the tag assigned thereto;
subsequent to learning the face model for the person, executing a face recognition algorithm over a second plurality of images stored on a second data repository that is inaccessible by way of the social network application, the second plurality of images being a personal image collection of the user, the face recognition algorithm configured to compare the face model with detected faces in the second plurality of images;

identifying the person in a second image in the second plurality of images based upon the executing of the face recognition algorithm over the second plurality of images; and assigning a second tag to the second image responsive to identifying the person in the second image, wherein the second tag indicates that the person is in the second image.

\* \* \* \* \*